Dec. 18, 1934.  G. H. PFEFFERLE  1,984,806
GASKET FOR PIPE JOINTS AND CLAMPS
Filed June 3, 1933  4 Sheets-Sheet 1

INVENTOR
George H. Pfefferle
BY
ATTORNEY

Dec. 18, 1934.  G. H. PFEFFERLE  1,984,806
GASKET FOR PIPE JOINTS AND CLAMPS
Filed June 3, 1933   4 Sheets-Sheet 2

Fig. 10.

INVENTOR
George H. Pfefferle
BY
ATTORNEY

Dec. 18, 1934.  G. H. PFEFFERLE  1,984,806
GASKET FOR PIPE JOINTS AND CLAMPS
Filed June 3, 1933  4 Sheets-Sheet 3
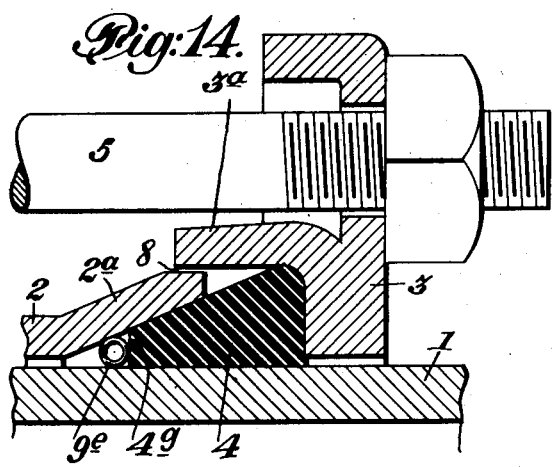
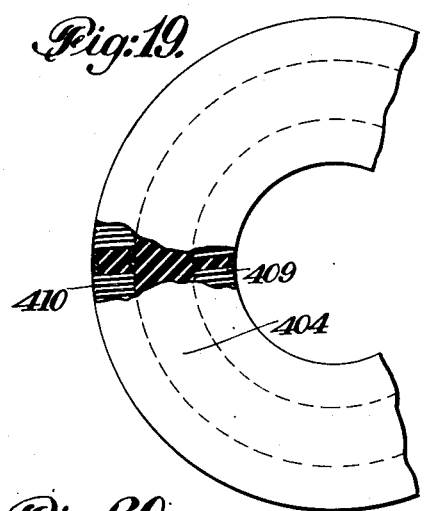
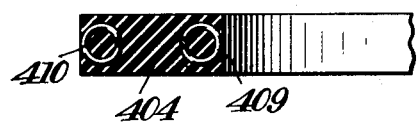
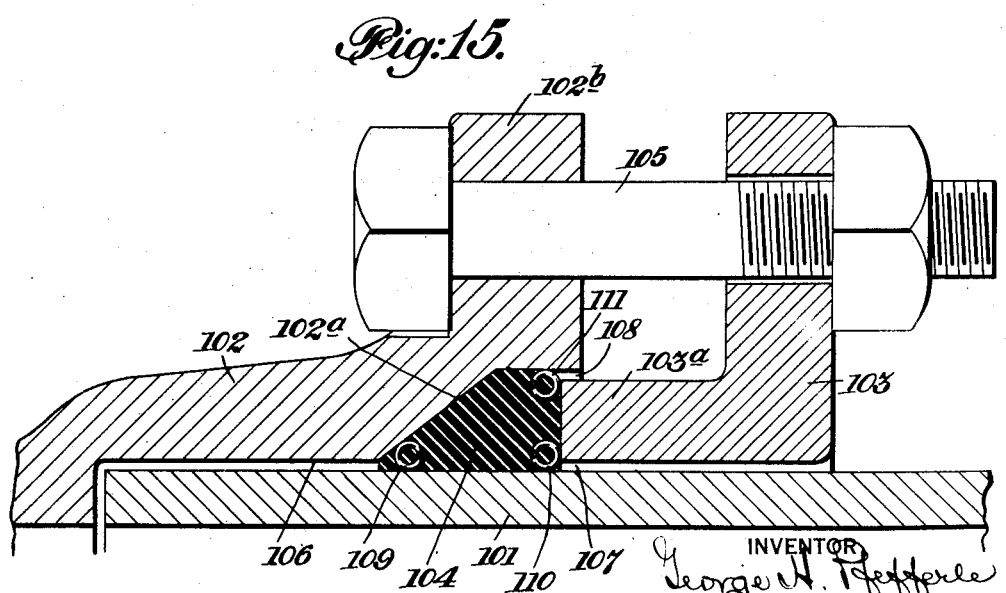

Dec. 18, 1934.  G. H. PFEFFERLE  1,984,806
GASKET FOR PIPE JOINTS AND CLAMPS
Filed June 3, 1933   4 Sheets-Sheet 4

INVENTOR
George H. Pfefferle
BY
Louis Prevost Whitaker
ATTORNEY

Patented Dec. 18, 1934

1,984,806

UNITED STATES PATENT OFFICE 1,984,806

GASKET FOR PIPE JOINTS AND CLAMPS

George H. Pfefferle, Bradford, Pa., assignor to S. R. Dresser Manufacturing Company, Bradford, Pa., a corporation of Pennsylvania Application June 3, 1933, Serial No. 674,161

11 Claims. (Cl. 288—1)

This invention consists in the novel features hereinafter described, reference being had to the accompanying drawings which show several embodiments of the invention, selected for purposes of illustration, and the said invention is fully disclosed in the following description and claims.

This invention relates particularly to pipe joints and repair devices in which rubber gaskets or packing rings are employed. In devices of this kind, it is extremely desirable to prevent the cold flow or extrusion of the gasket material (rubber or rubber composition) through clearances between adjacent metal surfaces, within which the gasket is confined and placed under high pressure, as obviously any such cold flow reduces the compression to which the gasket is subjected, and affords an opportunity for leakage. It is also desirable in some instances to protect certain portions of the gasket from deterioration, due to the presence of gases or liquids within the pipe line injurious to rubber. At the same time it is highly important not to materially reduce the elasticity of the gasket, and in the types of joints in which movement of the pipes with respect to an enclosing member of the joint is essential, to accommodate longitudinal expansion of the pipes or permit angular position of adjacent pipes with respect to each other, it is important that these features shall not be interfered with.

It has been proposed to provide, in connection with such gaskets, solid or rigid gripping members, embedded in a circular edge of the gasket, and arranged at intervals or continuously therein, but such gripping members being non-elastic obviously become wedged between adjacent metallic members of the joint and lock them so that relative movement thereof is prevented. It has also been proposed to sheathe or face one or more faces of the gasket with fabric, or sheet soft metal, as lead, or with a combination of both. These expedients have likewise proved unsatisfactory in practice; the fabric stiffens the gasket and is subject to deterioration and mechanical failure; lead has no resilience and tends to flow, and also to separate from the gasket when the latter is distorted. It has also been proposed to embed in the "heel" of a gasket, a pressure distributing element comprising a metallic helix, the coils of which are widely separated, but in practice this is found to detract from the elasticity of the gasket, while the rubber, when the gasket is placed under compression, readily extrudes between the adjacent helices, with consequent reduction of compression. The open helix is less elastic than a closed helix in the direction of the axis by virtue of the former having fewer coils and a greater helix angle. The open helix is considerably weaker under a transverse load than the closed helix.

According to the present invention, which is the result of extended study and experiment, the gasket is provided adjacent to one or more circular edges, with an armor consisting of a continuous closely coiled helix of any suitable form in cross-section, composed preferably of resilient wire, as steel wire of any desired cross section, with the individual coils substantially in contact with each other, throughout the length of the helix. The helix is not only very flexible throughout its length, but the close juxtaposition of its coils prevents the possibility of any of the rubber or rubber composition of the gasket being extruded past it or between the coils. The helix is also slightly compressible or elastic transversely. Such an armor, which is very flexible axially and comparatively rigid transversely, is particularly adapted for use with the gaskets of pipe joints, since it stretches and bends readily but resists crushing, while acting practically as efficiently as a solid wall in preventing extrusion, and in protecting adjacent surfaces of the gasket. Such an armor is practically indestructible, and at the same time is almost as elastic and flexible axially as the gasket material, and will resume its original shape after stretching. Such armor occupies, also, less space in a gasket of any given size than the usual lead or duck facing and therefore permits a greater effective area of the gasket material in contact with the pipe and joint. Furthermore, this armor will accommodate considerable variation in pipe diameters without permanent distortion. For example, such a gasket armor made with twenty five coils per inch for a twelve inch pipe, when placed on a pipe twelve and three tenths inches in diameter, necessitating a stretch of approximately an inch, this increase in length would be distributed around the circumferential length of the armor without separating the coils more than approximately one thousandth of an inch, a negligible distance, too small to permit any appreciable mechanical flow of rubber, or chemical attack from any destructive substances in the pipe.

It is found in practice that the presence of the close coiled helices renders the gasket practically immune from attack by liquids within or without the line, such as gasoline, drip oil, and the like, which disintegrate and destroy rubber and rubber compounds. These liquids are deposited within the lines conveying natural or artificial gas, and in the case of drip oil, the soil in the vicinity of gas plants is frequently saturated with it, so that the gaskets are liable to attack from such liquids from within and also from without the line. Such liquids will readily pass through the smallest crevices, and while the coils which I employ are close wound, they are not air or gas tight, and penetration by these destructive liquids would be ordinarily expected. As a matter of fact, however, it is found that these destructive liquids make no appreciable attack on the edges of gaskets protected by the close wound helices, as herein described, due to an unexpected co-operation between the close coils and the contiguous portions of the gasket material in intimate relation therewith, and after long exposure thereto, sufficient to practically destroy the like edges of ordinary unprotected gaskets, they are found to be practically unaffected.

It will be understood that the armor may be embedded in the gasket material, preferably adjacent to the junction of two faces thereof, angularly disposed to each other, or it may be used exteriorly to the gasket, as preferred, and the armor will preferably be made endless, in any desirable way, as hereinafter described, where the gasket itself is endless. Where the armor is molded in the gasket, it is immaterial whether or not it is filled within the coils with gasket material. It will be found in practice that the gasket material when subjected to vulcanizing heat in the mold, will usually enter and fill the interior of the helix, but as the elasticity and flexibility of the armor, axially, is substantially or nearly the same as that of the gasket material, this is unimportant. The gasket material will adhere tenaciously to the wire of the armor throughout its entire extent, when molded in the gasket, and the wire of the helix may be suitably treated by plating with copper or other suitable metal, or otherwise to insure or increase the adhesion of the gasket material thereto.

In the accompanying drawings several embodiments of the invention, selected for purposes of illustration, are shown, the invention including certain novel features of construction and combination of parts hereinafter fully described and particularly pointed out in the claims.

In the said drawings,

Fig. 10 is a similar view, showing another means of making the armor helix endless.

Fig. 14 is a sectional view, similar to Fig. 2, showing the gasket provided with an extraneous armor helix, the parts being in the positions which they occupy before the through bolts are tightened.

Fig. 15 is a partial sectional view of a bell and spigot joint of the stuffing box type, showing the gasket provided with an armor helix at three points.

Fig. 19 represents a partial plan view, partly in section, of an annular saddle gasket provided adjacent to its inner and outer edges with an armor helix.

Fig. 20 represents a partial sectional view of the gasket shown in Fig. 19.

Fig. 21 illustrates the positions assumed by the adjacent coils of the helices in the gasket illustrated in Figs. 19 and 20, when under heavy compression between opposed surfaces.

Figure 1:
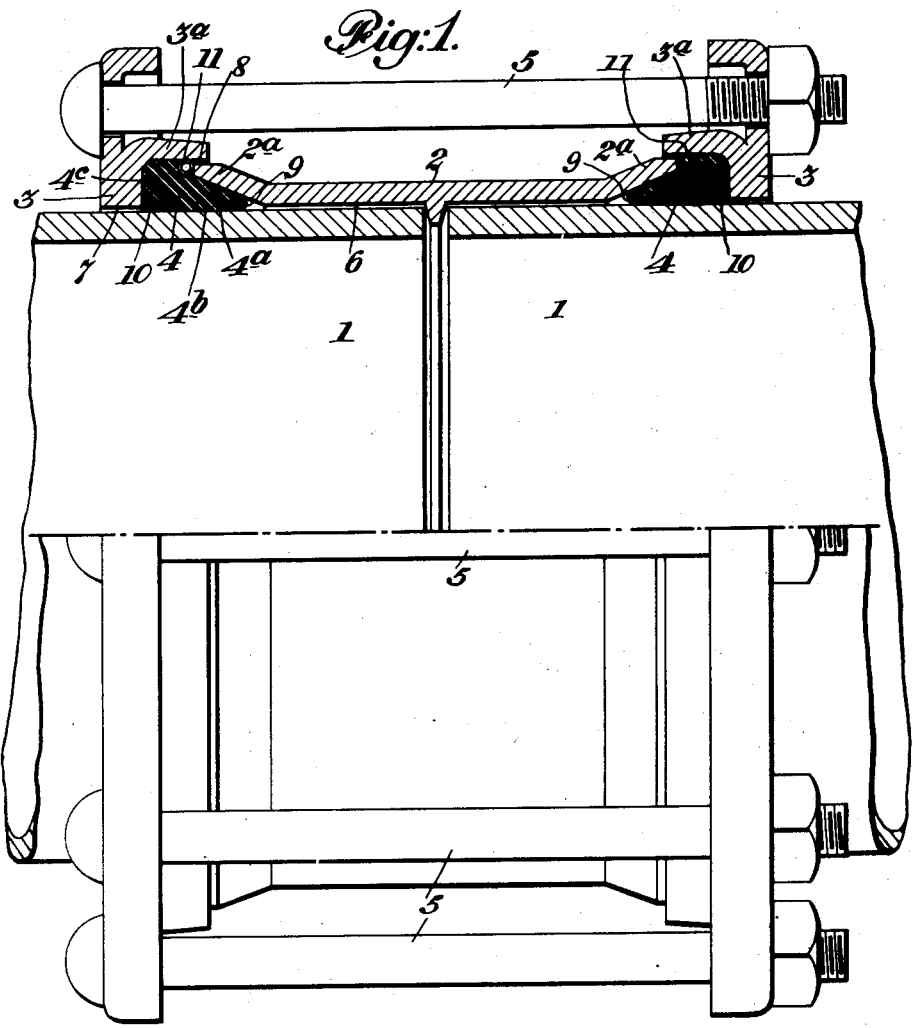
Fig. 1 represents a side elevation, partly in section, of a coupling for plain end pipes, having the annular gaskets thereof armored in accordance with the present invention.
Figure 2:
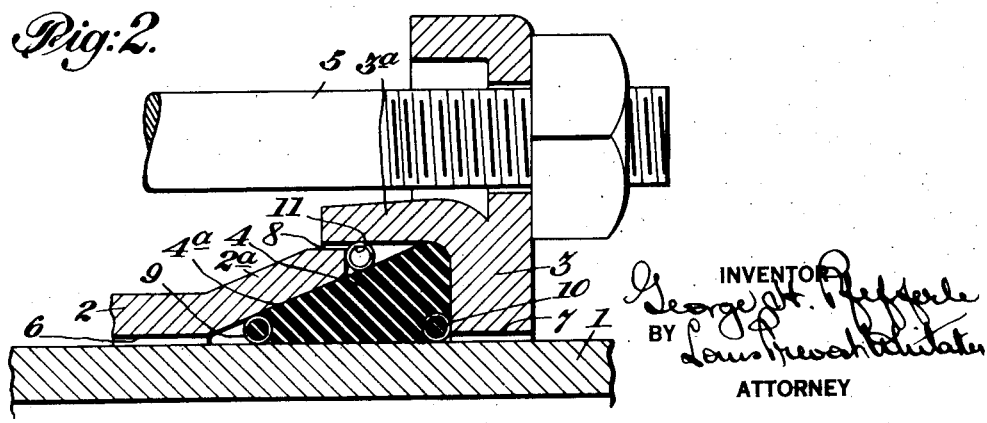
Fig. 2 is an enlarged sectional view of a portion of the coupling illustrated in Fig. 1, showing a single gasket before the through bolts are fully tightened.
Figure 3:
Fig. 3 is a detail perspective view of a portion of an armor helix approximately triangular in cross section.
Figure 4:
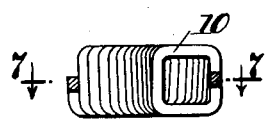
Fig. 4 is a similar view of an armor helix, square in cross section.
Figure 5:
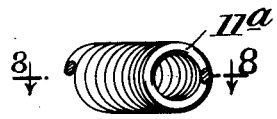
Fig. 5 is a similar view, showing an armor helix, circular in cross section.
Figure 6:
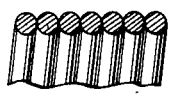
Fig. 6 represents a partial sectional view of an armor helix of any desired shape, formed of wire circular in cross section.
Figure 7:
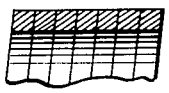
Fig. 7 represents a similar partial section of a helix formed of wire approximately rectangular in cross section.
Figure 8:
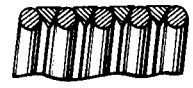
Fig. 8 represents a similar partial sectional view of a helix formed in part of wire, circular in cross section, and in part of wire triangular in cross section.

In Figs. 1 and 2, 1—1 represent plain end pipe sections adapted to be connected by a coupling of the well known Dresser type, comprising a middle ring, 2, having flared end portions, 2a, 2a, to form packing recesses, clamping rings, 3, gaskets, 4, in this instance of wedge shape in cross section, the clamping rings being connected by through bolts, 5. In order to accommodate variations in the exterior diameter of commercial pipe sections, it is necessary that there shall be a clearance, indicated at 6, between the inner surface of the middle ring, 2, and the pipe sections, a clearance indicated at 7, between the pipe apertures of each clamping ring, and the pipe sections, and there is also a third clearance, indicated at 8, between the outer edge of the flared portion of the middle ring and the flange portion, 3a, of the clamping ring. These clearances must of necessity vary somewhat in actual practice, depending upon the exterior diameter of the pipes, and when the through bolts are tightened and great pressure exerted on the gaskets, 4, of rubber or rubber composition, portions of the latter may, and frequently do, flow or extrude into such clearances. This extrusion is most likely to take place at the edge of the gasket where the outer inclined face, 4a, meets the interior cylindrical face, 4b, which edge may be conveniently termed the leading edge or "toe" of the gasket. In this instance the toe of the gasket is provided with an annular armor helix, 9, which as shown, is of circular form in cross section, as illustrated in detail in Fig. 5, and is shown as embodied or embedded in the toe portion of the gasket, so that its inner and outer faces are flush respectively with the faces, 4a and 4b, thereof. While preferable to use a helix of circular form in cross section, as shown in connection with portions of a gasket adjacent to any of the clearances mentioned, it is in some instances desirable to employ a helix the general cross section of which conforms to the normal cross section of the portion of the gasket in which it is embedded or in connection with which it is used. The helix, 9, as well as the others hereinafter referred to, are preferably formed from resilient wire of suitable metal, as steel, which may be circular in cross section, as shown in Fig. 6, or rectangular in cross section as shown in Fig. 7, or of any other desired cross section. In Fig. 8, for example, the resilient helix is shown as composed of alternating coils of circular cross section and triangular cross section by way of example.

Figure 9:
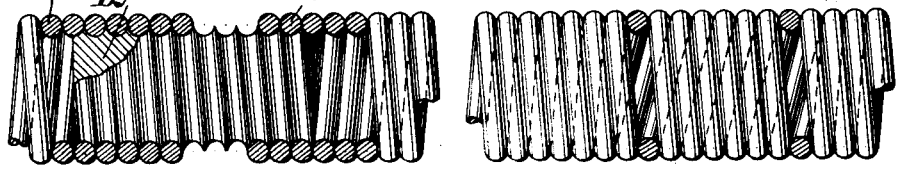
Fig. 9 is a section, partly in elevation, showing one arrangement for uniting the ends of an armor helix.

The helix is formed as a close coil, that is to say, the adjacent coils throughout the length of the helix, are substantially in contact with each other, as indicated for example in Figs. 6 and 7. The armor helix may be used as a split ring or the meeting ends may be joined in any convenient manner to form an endless ring. In Fig. 9 there is shown one form of connector, which consists of a short pin, indicated at 12, exteriorly threaded, to fit the interior of the helix. One end of the pin is screwed into one end of the helix, and the other end of the helix is given the desired number of rotations in the reverse direction, then placed in engagement with the pin and screwed onto the pin. In Fig. 9 the opposite ends of the helix indicated at 9a, 9b, are illustrated in engagement with the pin, 12, just before the end 9b, is brought into contact with the end, 9a. In Fig. 10 another method of uniting the ends of the helix, which consists in interlocking a plurality of the coils of each end portion in a well known way, is shown. The ends of the helix can obviously be joined by any other suitable method as by soldering, brazing, welding, or the provision of an eye on one end and a hook on the other, all of which are so obvious that they do not need illustration.

In this instance the gasket is shown as further provided with a second annular helix, 10, circular in cross section and embedded therein at the intersection of the cylindrical face, 4b, with the outer perpendicular face, 4c, at a point frequently termed the "heel" of the gasket, adjacent to the clearance, 7. It is necessary that the maximum diameter of the coils of each helix shall be greater than the width of the clearance adjacent to which it is used, and preferably sufficiently greater than the clearance so that in case of shifting of the pipe sections angularly to each other, with the result that the clearance becomes greater on one side of the pipe than the other, the helix shall have its coils of greater diameter than the maximum clearance which can be brought about in the joint.

In this instance there is shown a third annular armor helix, 11, here shown as circular in cross section, to engage the inclined face, 4a, of the gasket opposite the clearance, 8. In Figs. 1 and 2, this helix, 11, is shown as entirely separate from the gasket, but it may be embedded in a portion of the gasket, as shown in Fig. 12, in which figure it is shown as triangular in cross section, but it may be of any desired form.

In Fig. 2 the parts of the coupling are shown in the positions which they occupy before the through bolts are tightened to the fullest extent, while in Fig. 1 the parts are shown in positions which they occupy when the bolts, 5, are tightened and the rubber gaskets are placed under heavy pressure. It will be seen that at each clearance point, 6, 7 and 8, the close coiled helix acts as a dam to prevent the possibility of any appreciable extrusion of the gasket material. Thus, the high degree of pressure of the gasket faces, 4a, 4b, against the inner face of the packing recess and the exterior of the pipe respectively, which is relied upon to produce a tight joint, can be readily secured and positively maintained. It will also be seen that a greater area of gasket surface will be in contact with the inner wall of the packing recess and with the exterior of the pipe than would be the case if the toe of the gasket were sheathed with lead or canvas, or both, as the helix, 9, occupies a very small space in the toe of the gasket, and as a matter of fact, may be entirely disconnected therefrom, in some instances, as hereinafter described. It will also be seen that the close coiled armor helix, 9, effectually protects the toe of the gasket from deterioration, due to the presence of liquid or gaseous contents of the pipe line, which might be injurious to rubber. It is to be understood that in some instances the armor helix, 10, at the heel of the gasket and the armor helix, 11, on the outer face of the gasket, may be omitted altogether, where the clearances at such points are not excessive, as shown for example, in Fig. 13, but it is preferred to use the armor helix at all three of the points shown in Figs. 1 and 2.

Figure 11:
Fig. 11 is a sectional view showing an armor helix separate from the gasket and embodied in a triangular body of gasket material, for use on the exterior face of the gasket.

In Fig. 11, there is shown an armor helix, 11a, in this instance circular in cross section, and intended to be used on the outer face, 4a, of the gasket. In this instance the armor helix, 11a, is embedded in a section of the gasket composition, indicated at 4d, to facilitate its application to the outer face 4a, of the gasket.

Figure 12:
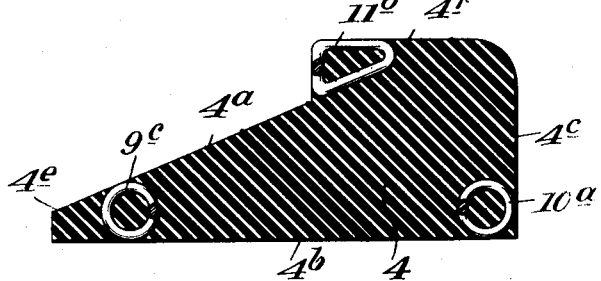
Fig. 12 is a sectional view of a gasket similar to that illustrated in Fig. 1, but illustrating a modification thereof.

In Fig. 12 the gasket, 4, is shown provided adjacent to the toe with an armor helix, 9c, circular in cross section, leaving a portion of the gasket material, indicated at 4e, extending beyond the helix. The gasket is also shown with an armor helix, 10a, circular in cross section, located at the heel of the gasket, and in this instance the gasket is provided with a shouldered portion on its outer face, indicated at 4f, in which an armor helix, 11b, triangular in cross section, is molded or embedded.

Figure 13:
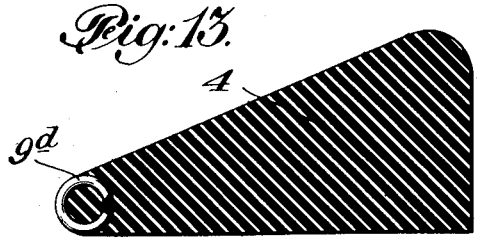
Fig. 13 represents a section of a gasket showing a single armor helix embedded therein, at the tapered edge thereof.

Fig. 13 shows a simple form of gasket in which a single armor helix, 9d, circular in cross section, is embedded in the toe portion for the purpose of preventing extrusion of the gasket material, and also protecting it against deterioration from gaseous or liquid contents of the pipe line.

In Fig. 14 there is illustrated a gasket, 4, in which the toe portion terminates in an annular shoulder, indicated at 4g, this gasket being used in connection with an armor helix, 9e, which engages the inner face of the packing recess in the middle ring and the outer surface of the pipe, but is entirely separate from the gasket. Under these conditions, nevertheless, the helix, 9e, will serve as a dam to prevent extrusion of the gasket material, and also protect it from deterioration. The parts in Fig. 14 are shown before the bolts are tightened.

Fig. 15 illustrates the application of the invention to a pipe joint of the bell and spigot stuffing box type. In this figure, 101 represents the spigot end of one pipe section, and 102, the bell end of an adjoining pipe section, provided with the packing recess, 102a, and having an outwardly extending flange, 102b, provided with bolt holes. 103 represents the follower having the annular packing engaging flange, 103a, provided with bolt holes, and 105 represents one of the through bolts. In this type of coupling there will be clearances at the points indicated at 106, 107 and 108, and the gasket, 104, is shown provided with armor helices, 109, 110 and 111, which in this instance are shown as of circular form in cross section and embedded or molded into the gasket material adjacent to said clearances. It will be understood, however, that the helices may be of any desired cross section and may be used separately from the gasket at the points contiguous to the several clearances if this should be found desirable. It will also be understood that the gasket may be provided with one or more of the armor helices shown, according to the necessity therefor.

Figure 16:
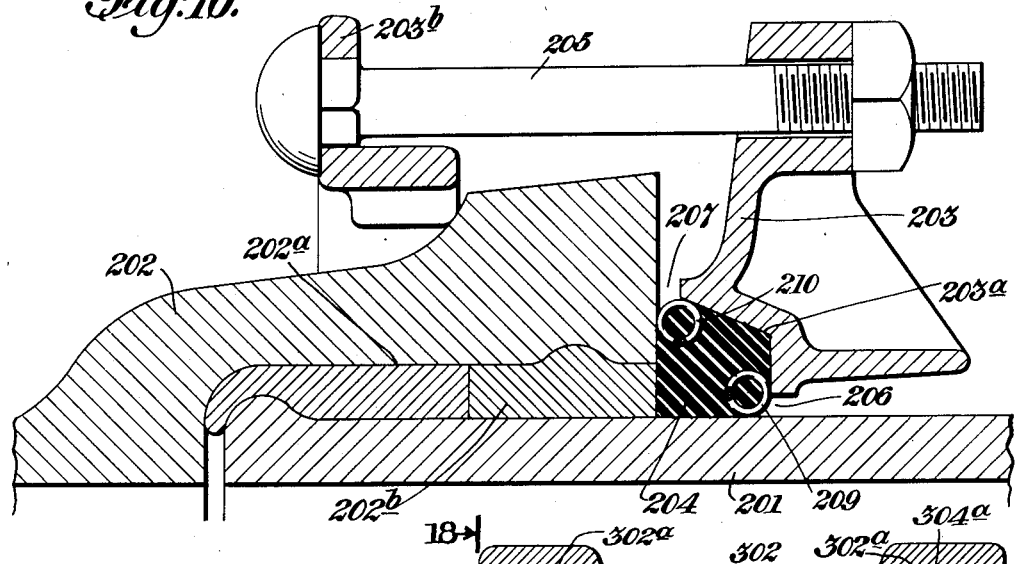
Fig. 16 is a partial sectional view of a bell and spigot joint, equipped with a repair clamp, the gasket for the clamp being provided with an armor helix at two points therein.

This invention is especially valuable in connection with gaskets for bell and spigot repair clamps, for the reason that the clearances encountered in such devices are usually large. In Fig. 16 there is shown this type of clamp embodying the present invention. In this figure, 201 represents the spigot, 202 the bell, provided with a packing recess, 202a, closed at its outer end by solid packing, 202b, in the usual manner. 203 represents the clamping ring provided in this instance with a packing engaging recess, 203a, and having the usual bolt apertures to receive the through bolts, 205, which connect it with the usual bull ring, 203b. In this instance it will be noted that there is a clearance, 206, between the pipe aperture of the clamping ring and the exterior of the spigot, 201, and a clearance, 207, between the packing engaging portion of the clamping ring and the face of the bell. In this instance the gasket, 204, is shown provided with armor helices, 209 and 210, adjacent to the clearances, 206 and 207, the helices being of greater diameter than the clearances, and in this instance being shown as circular in cross section and embedded in the gasket. It is to be understood, however, and this applies to all showings of the armor helices in the various figures, that helices of any other cross section which may be particularly convenient or desirable, may be substituted for the particular form of armor helix shown in Fig. 16, or any of the other figures. It is also to be understood that in the construction shown in Fig. 16, as well as the construction shown in other figures, the helix may be and preferably is embedded in the gasket material, but may be separate therefrom, after the manner illustrated in Fig. 14, if any advantage or desirable results are secured thereby. In some instances the armor helix, 209, adjacent to the pipe aperture may be dispensed with, especially where the clamping ring is provided with means for adjusting the pipe aperture to accommodate variations in the outside diameter of the pipe.

Figure 17:
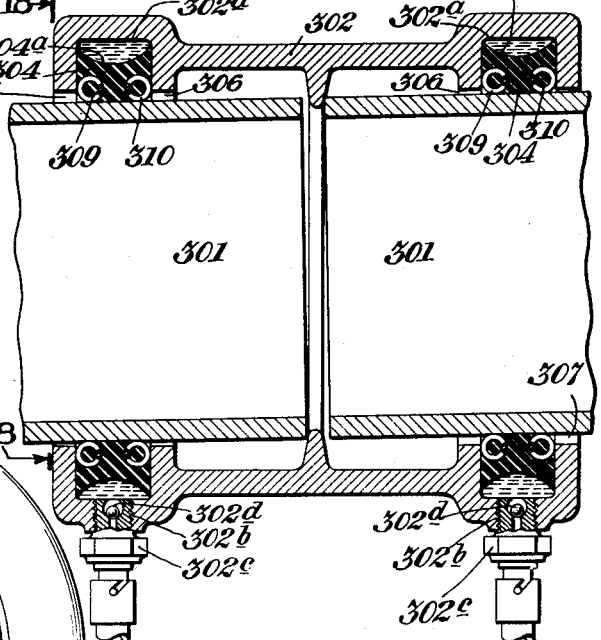
Fig. 17 represents a coupling for plain end pipes in which the gaskets are subjected to hydraulic or other fluid pressure, showing the gaskets thereof provided each with armor helices as at two points therein, the pipes being shown with their axes eccentric to the axis of the coupling sleeve.
Figure 18:
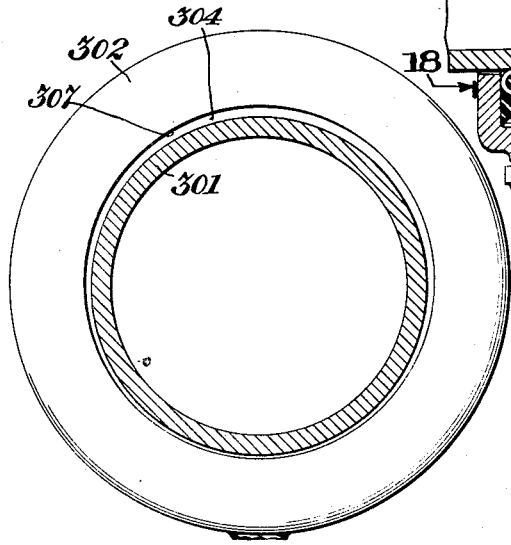
Fig. 18 represents a section on line 18—18 of Fig. 17.

This invention is also applicable to the type of couplings and pipe joints in which the gasket is compressed readily by hydraulic or other means. In such joints it is difficult to center the pipes and enclosing members, because the outer or enclosing member of the joint moves in the direction of least resistance, frequently throwing all of the clearance allowed to one side of the joint, which in the ordinary forms of gasket permit portions thereof to extrude from the recesses at such points. By providing the gaskets of such joints with closely coiled armor helices adjacent to the clearances, and of diameters greater than the maximum possible clearance which can occur at any point in the joint, this difficulty is completely avoided without materially impairing the resiliency of the gasket or its sealing value, and positively protecting the gaskets from injury, due to the presence of fluid in the line. In Figs. 17 and 18 there is shown such a joint in which 301, 301, represent plain end pipes, the ends of which are inserted in a coupling sleeve, 302, provided at each end with an annular recess, 302a, the lateral walls of which are provided with pipe apertures slightly greater than the exterior diameter of the pipe sections, and provide clearances, as indicated at 306 and 307. In these figures the pipes are shown as not coaxial with the coupling sleeve, producing a variation in the clearance at opposite sides of the pipes, as clearly shown in Fig. 18. Each of the packing recesses, 302a, is provided with a rubber gasket, 304, in which, as shown, are embedded the armor helices, 309, 310, of greater diameter in cross section than the maximum possible clearance at either side of the pipe. These armor helices, as will be clearly seen, effectually prevent extrusion of the gasket material, and the protection of the gasket material from injurious fluids in the line, without reducing the effectiveness of the coupling. As shown, the gaskets are provided with recesses on their outer faces, indicated at 304a, and it will be understood that the joints are made tight by filling the space within the packing recesses of the sleeve on the outer side of the packing rings with fluid under pressure in a well known way, which may be introduced in any desired manner. In Fig. 17, threaded apertures, 302b, are shown for this purpose, and are closed by screw plugs, 302c, provided with inwardly opening valves, 302d.

In all the forms of the invention illustrated and described in connection with the preceding figures, it will be understood that the helices may be, and preferably will be, made endless, where the gasket is of annular and endless form. Where the helices have their ends connected it will be perfectly obvious that the small amount of stretch required to accommodate the variations in commercial pipes of given size will be readily accomplished without any material separation of the adjacent coils of the helices as previously noted. Where the gasket is cut at one point, as is customary for application to pipe lines already laid, as in the case of repair clamps, etc., the helices, if not molded in the gasket, may be readily made endless in situ, around the pipe in any of the ways heretofore referred to, or otherwise. Where they are molded in the gasket, the meeting ends of the helices may be united in situ or the gasket may be used without uniting the ends of the helices, as may be found most desirable.

It has also been found practical and advantageous to embed the close coiled armor helices of resilient material in the inner or outer edges, or both, of a flat annular gasket, such as are used, for example, in connection with saddle gaskets, a portion of one of which is illustrated in Figs. 19 and 20. In these figures, 404 represents the gasket, in this case having adjacent to its inner peripheral edge, a helix, 409, and a similar helix, 410, adjacent to its outer peripheral edge, although one or the other of said helices may be dispensed with if found desirable. The armor helix for gaskets of this type is preferably made from a relatively fine wire and its behavior is somewhat different from the armors previously described, on account of the slight differences in the manner in which these gaskets, 404, are employed. Obviously this type of gasket is compressed between opposed, substantially parallel, faces, or flat surfaces which distort the gasket material and press the opposite faces thereof into sealing engagement with the compression faces acting thereon. Under these conditions, the armor helix will ordinarily accommodate the distortion of the gasket and follow the same by a shifting of the planes of its several coils angularly with respect to the longitudinal axis of the coil, as clearly illustrated in Fig. 21. It will be seen that the elasticity of the material in which the armor helices are preferably formed, readily permits this distortion of the helix, and will of course restore the helix to its original form and cross section upon the release of pressure. While in the compressed condition the coils are forcibly held in close relation and will thus protect the edges of the gasket against chemical attack while leaving the largest possible area of the gasket to sealingly engage the opposed pressure surfaces.

What is claimed and desired to be secured by Letters Patent is:

1. A packing gasket for pipe joints having portions provided with an armor helix comprising continuous metallic coils substantially in contact with each other and co-operating with contiguous gasket material in intimate contact therewith to protect the gasket from disintegration by attacking liquids, said coils maintaining this relation at all times and particularly when the gasket is in operative position within the pipe joint to function for the purpose intended.

2. A packing gasket for pipe joints, provided with an inner substantially cylindrical pipe engaging face, provided adjacent to the intersection of said face with another face of the gasket at an angle thereto, with an armor helix composed of continuous metallic coils substantially in contact with each other and co-operating with contiguous gasket material in intimate contact therewith to protect the gasket from disintegration by attacking liquids, said coils maintaining this relation at all times and particularly when the gasket is in operative position within the pipe joint to function for the purpose intended.

3. A packing gasket for pipe joints having an armor helix comprising continuous coils substantially in contact with each other throughout the helix, embedded in the gasket material adjacent to an edge of the gasket, and co-operating with the portions of the gasket material in intimate contact with said coils, to protect the gasket from disintegration by attacking liquids.

4. A packing gasket for pipe joints having an inner substantially cylindrical pipe engaging face, and an exterior substantially conical face for engaging the inner face of a packing recess, and forming between said faces an annular toe portion, said gasket being provided adjacent to said toe portion with an armor helix composed of continuous resilient coils substantially in contact with each other and forming a dam to prevent extrusion of said toe portion and co-operating with contiguous portions of the gasket material in intimate contact therewith to protect it from the effects of injurious fluids.

5. A rubber packing gasket for pipe joints having an inner substantially cylindrical pipe engaging face, and an exterior substantially conical face for engaging the inner face of a packing recess, and forming between said faces an annular toe portion, said gasket being provided with an annular armor helix composed of continuous coils of resilient material substantially in contact with each other and molded in the toe portion of the gasket, said helix serving as a dam to prevent extrusion of the adjacent rubber portions of the gasket, and co-operating with contiguous portions of the rubber in intimate contact therewith to protect the gasket from the effects of injurious fluids.

6. A packing gasket for pipe joints having an inner substantially cylindrical pipe engaging face, and an exterior substantially conical face for engaging the inner face of a packing recess, and forming between said faces an annular toe portion, said gasket having a face substantially at right angles to said cylindrical faces forming a heel portion at the intersection of said faces, and having said toe portion and heel portion each provided with an armor helix comprising continuous resilient coils substantially in contact with each other said coils co-operating with the portions of gasket material in intimate contact therewith to prevent disintegration of the gasket by attacking liquids and extrusion of the gasket material.

7. A packing gasket for pipe joints having an inner substantially cylindrical pipe engaging face, and an exterior substantially conical face for engaging the inner face of a packing recess, and forming between said faces an annular toe portion, said gasket having said exterior face provided at a distance from said toe portion with an armor helix comprising continuous resilient coils substantially in contact with each other and forming a dam to prevent extrusion of the adjacent portions of the gasket.

8. A packing gasket for pipe joints having an inner substantially cylindrical pipe engaging face, and an exterior substantially conical face for engaging the inner face of a packing recess, and forming between said faces an annular toe portion, said gasket having said exterior face provided at a distance from said toe portion, with an armor helix comprising coils substantially in contact with each other co-operating with the portions of gasket material in intimate contact therewith to prevent disintegration of the gasket by attacking liquids and forming a dam to prevent extrusion of the adjacent portions of the gasket, said armor helix being molded in an annular body of rubber extending around the gasket, but separate therefrom.

9. A packing gasket for pipe joints having an inner substantially cylindrical pipe engaging face, and an exterior substantially conical face for engaging the inner face of a packing recess, and forming between said faces an annular toe portion, said gasket having said exterior face provided at a distance from said toe portion with an armor helix comprising coils substantially in contact with each other co-operating with the portions of gasket material in intimate contact therewith to prevent disintegration of the gasket by attacking liquids and forming a dam to prevent extrusion of the adjacent portions of the gasket, said armor helix being molded in an annular body of rubber extending around the gasket, and integral therewith.

10. A packing gasket for pipe joints having an inner substantially cylindrical pipe engaging face, and an exterior substantially conical face for engaging the inner face of a packing recess, and forming between said faces an annular toe portion, said gasket having a face substantially at right angles to said cylindrical face forming a heel portion at the intersection of said faces, said toe and heel portions being each provided with an annular armor helix comprising coils substantially in contact with each other, and said exterior face being provided at a point located at a distance from the said toe portion, with a similar armor helix said helices being composed of resilient material and co-operating with the portions of gasket material in intimate contact therewith to prevent disintegration of the gasket by attacking liquids.

11. A packing gasket for a bell and spigot joint of the stuffing box type having an inner cylindrical pipe engaging face, a substantially conical face to engage the inner face of a packing recess and forming a toe portion between said faces, and an exterior end face substantially perpendicular to the axis of the gasket, said gasket having adjacent to its toe portion and adjacent to the inner and outer portions of said end face, armor helices, each comprising coils substantially in contact with each other said helices being composed of resilient material and co-operating with the portions of gasket material in intimate contact therewith to prevent disintegration of the gasket by attacking liquids.

GEORGE H. PFEFFERLE.